United States Patent Office 3,308,132
Patented Mar. 7, 1967

3,308,132
6,8-DITHIOOCTANOYL AMIDES AND
INTERMEDIATES
Masao Ohara, Ibaraki, Kiyotsugu Yamamoto, Osaka, Yoshio Deguchi, Suita, and Kichizo Endo, Minamiku, Kyoto, Japan, assignors to Fujisawa Pharmaceutical Co., Ltd., Osaka, Japan, a company of Japan
No Drawing. Filed Oct. 11, 1960, Ser. No. 61,822
Claims priority, application Japan, Oct. 13, 1959, 34/32,467, 34/32,468, 34/32,469, 34/32,471
13 Claims. (Cl. 260—294.8)

This invention relates to octanoyl amides and more particularly to dithiooctanoyl amides and intermediates thereof, and to a process of making same.

More particularly, this invention is concerned with novel processes for producing compounds having the general formula

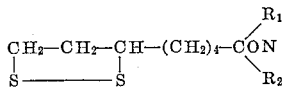

wherein $R_1$ and $R_2$ are either hydrogen or organic radicals. In its more specific aspects, the invention contemplates selecting the radicals from the group consisting of alkyl, aryl radicals, the residue of isonicotinic acid hydrazide, α-amino acid and α-amino acid lower alkyl esters.

The 6,8-dithiooctanoyl amides of this invention, which include thioctamide and its derivatives, are similar in their physiological effects to thioctic acid, which is known for its vitamine-like action as well as for its potent action to promote liver function and detoxification capacity. It has been ascertained by laboratory tests and by clinical experiments carried out with the novel substances that they exhibit an activity superior to that of thioctic acid. Further, it has become clear that preparations of the 6,8-dithiooctanoyl amides may be expected to have favourable natures: stable, tasteless and odourless, though that of thioctic acid has some faults desired to be improved in these aspects.

The following methods have been described for synthesizing 6,8-dithiooctanoyl amide in the laboratory. The first [A. F. Wagner et al., "J. Am. Chem. Soc.," vol. 78, p. 5081 (1956)] starts with 6,8-dithiooctanoic acid, or thioctic acid and comprises reacting said acid with an alkali metal, drying the resulting product by freeze drying, reacting the alkali metal salt of the acid thus produced with oxaloyl chloride in dry benzene and then with ammonia under anhydrous conditions. The second method [L. J. Reed et al., "J. Biol. Chem.," vol. 1958, p. 1451] starts also with thioctic acid and comprises reacting a solution of thioctic acid and triethylamine in tetrahydrofuran with isobutyl chloro formate and then with ammonia.

These known methods are complicated in operation and the yield of the product is not satisfactory.

It is an object of this invention to provide a novel, economical, and improved process of producing 6,8-dithiooctanoyl amide and analogues thereof and intermediates useful in such a process.

Another object of the present invention is to provide a process for the preparation of the said intermediates.

Other objects of the present invention and advantageous features thereof will appear hereinafter.

The process of this invention comprises reacting a 6,8-dihalogeno octanoic acid with a halogenating agent, reacting the resulting 6,8-dihalogeno octanoyl halide with an amine having a reactive amino-hydrogen atom, the amine being of the formula

wherein $R_1$ and $R_2$ are the same substituents as indicated above, reacting the 6,8-dihalogenooctanoyl amide with sodium disulfide, or reacting said compound with an alkali metal thiosulfate, and heating the intermediate obtained thereby in the presence of water, to produce 6,8-dithiooctanoyl amide or analogues thereof, and if desired, treating the product with an alkaline agent.

The reaction steps of this invention may be illustrated diagrammatically as follows:

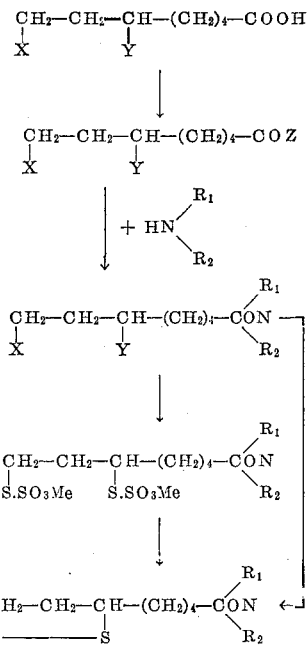

wherein X, Y and Z are the same or different halogens, Me is an alkali metal, and $R_1$ and $R_2$ are the same substituents as indicated above.

The reaction of 6,8-dihalogeno octanoic acid with a halogenating agent is effected in the presence or absence of a solvent. Examples of such solvents are benzene, chloroform and carbon tetrachloride, though any inert solvent may be used. Thionyl chloride, phosphorus oxychloride, phosphorus trichloride, and phosphorus tribromide are preferably employed as halogenating agent in this reaction. The reaction may be also carried out in the presence of a base such as pyridine. The reaction temperature depends upon the starting materials and the halogenating agent employed. In general the reaction is completed at room temperature or at slightly elevated temperature.

The resulting 6,8-dihalogeno octanoyl halide, which is a new compound, is reacted with the above indicated amine or a salt thereof in the presence or absence of a solvent and, if required, in the presence of a base such as alkali metal hydroxides, alkali metal carbonate, or pyridine. The reaction may be carried out at room temperature as well as while cooling or heating. Ammonia, primary or secondary alkylamines, and salts thereof, primary or secondary arylamines and salts thereof, α-amino acids and α-amino acid lower alkyl esters, isonicotinic acid hydrazide and the like represent examples of the amine used in this reaction.

The resulting 6,8-dihalogenooctanoyl amide, which is also a new compound, is reacted with sodium disulfide, which is a readily available reactant, to produce readily and in good yield the final product, 6,8-dithiooctanoyl amide. A solvent which is miscible with water such as a lower alcohol, e.g. methanol and ethanol is conveniently used in this reaction. The sodium disulfide is obtained by usual method known, e.g. by reaction of sodium sulfide with an about equimolar amount of sulfur. The quantitative relationship of the reactants affects the yield and the purity of the reactant product. For instance, (a) when sodium disulfide is employed as reactant which has been produced by reaction of an amount of sodium sulfide, which is somewhat in excess over that corresponding to the amide used, with an amount of sulfur which corresponds to the said sodium sulfide, the crude final product is obtained in a yield of about 70%. However, difficulties are encountered in purifying said compound by recrystallization. (b) When sodium disulfide is employed which has been produced by the reaction of an amount of sodium sulfide which is somewhat lower than the equivalent amount of the amide used, with an amount of sulfur equimolecular to that of said sodium sulfide, the yield is rather low, but the resulting final product is of high purity and is readily purified by recrystallization. (c) When sodium disulfide is employed which is produced by reaction of a somewhat excess of sodium sulfide over that corresponding to the amide used, with an amount of sulfur which is nearly equimolecular to that of the amide used, the yield is nearly the same as obtained according to method (a) and the purity of the final product is the same as that obtained according to method (b).

It is, therefore, the preferred procedure to employ the method (c) when a pure product is required, for instance, for medical purposes without further purification.

The 6,8-dithiooctanoyl amides of the above given formula may also be prepared by way of the intermediates having thio alkali metal sulfo radicals at the 6- and 8-positions of the starting compounds. Such intermediates are called "Bunte salts." The 6,8-dihalogeno octanoyl amide is reacted with alkali metal thiosulfate and the resulting "Bunte salt" is heated in the presence of water to cause decomposition and ring closure, and then to produce the final products. In this reaction it is not necessary to separate the intermediate. As a result thereof the reaction may be completed in the same reaction vessel. Reaction of a 6,8-dihalogeno octanoyl amide with an alkali metal thiosulfate may conveniently be effected by heating the reaction mixture on the water-bath, in the presence of a water-miscible solvent such as methanol or ethanol. If a compound having chlorine in 6- and/or 8-positions is used as the starting material in the reaction, it is preferred to add an iodine compound to the reaction mixture to facilitate the reaction. The conversion of the "Bunte salt" into the final product may readily be effected within a short period of time in the presence of an ionizable heavy metal salt such as the halide, nitrate, sulfate, or another inorganic or organic salt of copper, zinc, iron, tin, mercury, and the like. The reaction may also be completed in the absence of the indicated metal salt. After the reaction is completed, the reaction product is extracted with a solvent such as ether, benzene, ethyl acetate, and the like, and the solvent is removed to yield the desired compound as residue.

The 6,8-dithiooctanoyl amide ordinarily contains some by-products which are apparently linear-polymers and/or compounds containing larger amounts of sulfur. In most cases it is rather difficult to remove such by-products by the conventional purification methods such as by recrystallization or fractional distillation.

Therefore, the crude final product is purified by a treatment with alkali metal hydroxides. Reaction is effected at room temperature. Heating to 80° C., however, accelerates the reaction. It is assumed that thereby the polymers in the by-product are decomposed and that the dithiolan ring is formed in the poly-sulfur compounds. If the amine portion of the final product is an α-amino acid lower alkyl ester, hydrolysis takes place on this treatment and a product wherein the amine portion is an α-amino acid, is obtained.

The following examples serve to illustrate the present invention without, however, limiting the same thereto.

Example 1

67 g. of 6,8-dichlorooctanoic acid are dissolved in 150 cc. of dry benzene and 54 g. of thionyl chloride are added to the solution. The mixture is heated for two hours in a water bath kept at 65° C. The benzene and the residual thionyl chloride are driven off and the residue is distilled in vacuo yielding 68 g. of 6,8-dichlorooctanoyl chloride, $B.P._{0.5}$ 115–120° C. Yield 93%.

Equivalent amounts of phosphorus oxychloride or phosphorus trichloride when substituted for thionyl chloride, form the same product. The corresponding bromide is obtained by reaction with phosphorus tribromide and may be substituted in equimolecular amounts for the chloride in the reactions of Examples 2 to 7 hereinbelow. The same reaction products are obtained in substantially the same yields.

Example 2

8.1 g. of 6,8-dichlorooctanoyl chloride are added drop by drop under stirring to about 30 cc. of a 28% aqueous solution of ammonia under cooling with ice-water. Crystals are formed immediately. The crystals are gathered by filtration and recrystallized from a mixture of benzene and petroleum-ether. 6.5 g. of 6,8-dichlorooctanoyl amide, M.P. 79° C. is obtained in colorless plates.

*Analysis.*—Calculated for $C_8H_{15}ONCl_2$: C, 45.30; H, 7.13; N, 6.60. Found: C, 45.34; H, 7.26; N, 6.67.

Example 3

45.8 g. of 6,8-dichlorooctanoyl chloride are added drop by drop to a solution of 45 g. of diisopropylamine in 200 cc. of benzene at 10–20° C. and the solution is stirred at the same temperature for four hours. The mixture is consecutively washed with dilute hydrochloric acid, with an aqueous solution of sodium bicarbonate, and with water, and dried. The solvent is removed and the residue is distilled in vacuo yielding 50.0 g. (85% of theory) of N-diisopropyl 6,8-dichlorooctanoyl amide having a $B.P._{0.1}$ of 139–142° C.

*Analysis.*—Calculated for $C_{14}H_{27}ONCl_2$: C, 56.75; H, 9.19; N, 4.73. Found: C, 57.02; H, 9.10; N, 4.62.

Example 4

To a solution of 10.9 g. of DL-methionine and 13.0 g. of sodium bicarbonate in 50 cc. of water is added drop by drop at room temperature a solution of 11.5 g. of 6,8-dichlorooctanoyl chloride in 50 cc. of ether and the resulting two-phase system is stirred for four hours. The ether layer is removed. The water layer is acidified with hydrochloric acid and extracted with chloroform. The extract is washed with water and dried. The chloroform is removed to obtain 14 g. of a crude oil of N-(6,8-dichlorooctanoyl)-DL-methionine.

The following method is used for identification of the product.

Phenacyl bromide is reacted with a small amount of this product to obtain N-(6,8-dichlorooctanoyl)-DL-methionine phenacyl ester, which is recrystallized from ethanol to obtain crystals of M.P. 86–88° C.

*Analysis.*—Calculated for $C_{21}H_{29}O_4NSCl_2$: C, 54.54; H, 6.32; N, 3.03. Found: C, 54.83; H, 6.41; N, 2.66.

Example 5

To a mixture of 13.5 g. of dimethyl L-glutamate, 60 g. of pyridine and 120 cc. of benzene are added drop by drop at room temperature 15.1 g. of 6,8-dichlorooctanoyl chloride under stirring and the mixture is allowed to stand at room temperature overnight. The reaction mixture is washed sequentially with dilute hydrochloric acid, with an aqueous solution of sodium bicarbonate and with water, and dried. The benzene is removed to obtain 20 g. of crude oil of dimethyl N-(6,8-dichlorooctanoyl)-L-glutamate.

Example 6

10.0 g. of 6,8-dichlorooctanoyl chloride is added drop by drop to a solution of 11.3 g. of aniline in 100 cc. of benzene under stirring at about 10° C. and the mixture is stirred further for five hours at room temperature. The reaction mixture is washed with dilute hydrochloric acid, with an aqueous solution of sodium bicarbonate and with water, dried and concentrated to about ⅓ of its original volume. Petroleum ether is added to the solution to precipitate 6.2 g. (50% of theory) of 6,8-dichlorooctanoyl aniline, which is recrystallized from benzene-petroleum ether to form crystals of M.P. 70° C.

*Analysis.*—Calculated for $C_{14}H_{19}ONCl_2$: C, 58.33; H, 6.59; N, 4.86. Found: C, 58.47; H, 6.83; N, 4.92.

Example 7

To a suspension of 13.7 g. of isonicotinic acid hydrazide in 150 cc. of pyridine 23.2 g. of 6,8-dichlorooctanoyl chloride are added drop by drop at room temperature under stirring. The isonicotinic acid hydrazide dissolves slowly. The mixture is allowed to stand overnight. The solvent is distilled off at reduced pressure and the residue is extracted with ethyl acetate. The extract is washed with water and dried. The ethyl acetate is evaporated to obtain 21.5 g. (65% of the theoretical yield) of 1-isonicotinoyl-2-(6,8-dichlorooctanoyl)-hydrazine, which is recrystallized from benzene and forms crystals of M.P. 109° C.

*Analysis.*—Calculated for $C_{14}H_{19}O_2N_3Cl_2$: C, 50.61; H, 5.77; N, 12.65. Found: C, 50.63; H, 5.94; N, 12.71.

Example 8

14.1 g. of sodium sulfide $Na_2S.(9H_2O)$ and 1.9 g. of sulfur are mixed with 100 cc. of methanol and the mixture is heated until the sulfur is dissolved. To the methanol solution of sodium disulfide thus obtained, a solution of 10.4 g. of 6,8-dichlorooctanoyl amide in 50 cc. of methanol is slowly admixed and the mixture is heated under reflux for six hours. The methanol is then driven off, water is added, and the reaction mixture is extracted with chloroform. The chloroform layer is washed with water and dried, and the chloroform upon evaporation yields crystalline residue. This is recrystallized from benzene to obtain 6.9 g. (69% of the theoretical yield) of 6,8-dithiooctanoyl amide, M.P. 119–121° C. The crystals are further recrystallized twice from ethanol to obtain yellow needles of M.P. 124–125° C.

The molar proportion of the starting materials (amide: sodium sulfide:sulfur) in this example is 1:1.20:1.20.

*Analysis.*—Calculated for $C_8H_{15}ONS_2$: C, 46.80; H, 7.37; N, 6.80. Found: C, 46.77; H, 7.44; N, 6.79.

The ultraviolet absorption spectrum of this compound is $$\lambda_{max.}^{CH_3OH} \ 332 m\mu$$

and is irregular over the range of 250–340 m$\mu$ on account of contamination with by-products.

Treatment of the product with alkali such as caustic soda is effective to remove the by-products.

In the above reaction different results are obtained by changes in the molar ratio of the starting material as seen from Table 1.

The purification treatment of the product with alkali is illustrated by the following example:

2.0 g. of crude 6,8-dithiooctanoyl amide, M.P. 112–117° C. are dissolved in a solution of 0.5 g. of caustic soda in 20 cc. of 80% aqueous ethanol, and the solution is heated in a water bath to 80° C. for two hours. The ethanol is distilled off under reduced pressure. The liquid residue is extracted with ethyl acetate. The extract is washed with water and dried. The ethyl acetate is evaporated and the residue is recrystallized from benzene to obtain 1.0 g. of 6,8-dithiooctanoyl amide of M.P. 127–128° C.

*Analysis.*—Calculated for $C_8H_{15}ONS_2$: C, 46.82; H, 7.37; N, 6.80. Found: C, 46.59; H, 7.31; N, 6.62.

Ultraviolet absorption spectrum: $\lambda_{max.}^{CH_3OH}$ 331 m$\mu$, $\lambda_{min.}^{CH_3OH}$ 284 m$\mu$

Example 9

To a hot methanol solution of sodium disulfide which is prepared from 49 g. of sodium sulfide $Na_2S.(9H_2O)$, 5.4 g. of sulfur and 400 cc. of methanol a solution of 50 g. of N-diisopropyl 6,8-dichlorooctanoyl amide in 100 cc. of methanol is added drop by drop and the combined solutions are refluxed for 6 hours. 180 cc. of a 3% aqueous solution of caustic soda are added to the solution and the mixture is refluxed for an hour and a half. The methanol is distilled off, and the residue is extracted with chloroform. The extract is washed with water and dried. The chloroform is evaporated and the residue is distilled in a vacuum, yielding 29.2 g. (60% of the theoretical yield) of N-diisopropyl 6,8-dithiooctanoyl amide boiling at 152–157° C., 0.1 mm. Hg.

Ultraviolet absorption spectrum: $\lambda_{max.}^{CH_3OH}$ 332 m$\mu$ ($\epsilon$ 144)

*Analysis.*—Calculated for $C_{14}H_{27}ONS_2$: C, 58.11; H, 9.41; N, 4.83. Found: C, 58.00; H, 9.53; N, 4.53.

Example 10

To a hot methanol solution of sodium disulfide prepared from 15.5 g. of sodium sulfide, $Na_2S.(9H_2O)$, 1.7 g. of sulfur and 150 cc. of methanol is added drop by drop under stirring a solution of 20 g. of dimethyl N-(6,8-dichlorooctanoyl)-L-glutamate, prepared according to Example 5, in 100 cc. of methanol, and the resulting mixture is refluxed for eight hours. 150 cc. of a 3% aqueous solution of caustic soda are added, and the combined solutions are shaken at room temperature for 10 hours. The methanol is distilled off under reduced pressure. The residual solution is acidified with hydrochloric acid and extracted with chloroform. The solvent extract is washed with water and dried. The chloroform is distilled off to produce crystals of N-(6,8-dithiooctanoyl)-L-glutamic acid, which is recrystallized from ethyl acetate-petroleum ether to obtain crystals of a melting point of 105–107° C.

Ultraviolet absorption spectrum: $\lambda_{max.}^{CH_3OH}$ 332 m$\mu$ ($\epsilon$ 146)

*Analysis.*—Calculated for $C_{31}H_{21}O_5NS_2$: C, 46.56; H, 6.26; N, 4.17. Found: C, 46.63; H, 6.40; N, 4.10.

TABLE I

| Mole ratios of starting materials | | | Final product | | Note |
|---|---|---|---|---|---|
| Amide | Sodium sulfide | Sulfur | Yield (percent) | M.P. (° C.) | |
| 1 | 1.25 | 1.25 | 31 | 126–129 | Treated with alkali. |
| 1 | 0.95 | 0.95 | 48 | 125–126 | No treatment. |
| 1 | 1.25 | 1.1 | 69 | 125–126 | Do. |
| 1 | 1.35 | 1.1 | 60 | 129–130 | Treated with alkali. |

Example 11

To a hot methanol solution of sodium disulfide prepared from 10.8 g. of sodium sulfide, $Na_2S \cdot (9H_2O)$, 1.2 g. of sulfur and 80 cc. of methanol, are added drop by drop while stirring a neutral solution prepared by adding sodium methylate to a solution of 12.9 g. of N-(6,8-dichlorooctanoyl)-DL-methionine prepared according to the method of Example 4 in 80 cc. of methanol. The mixture is refluxed for six hours. 80 cc. of a 3% aqueous solution of caustic soda are then added and the mixture is shaken at room temperature for 10 hours. The methanol is evaporated under reduced pressure, and the residue is acidified with hydrochloric acid and extracted with chloroform. 6 g. of a gum-like by-product insoluble in the choloroform are produced. The extract layer is washed with water and dried. The chloroform is removed to produce crystals of N-(6,8-dithiooctanoyl)-DL-methionine which are recrystallized from ethyl acetate-petroleum ether to obtain crystals having a melting point of 99–102° C.

Ultraviolet absorption spectrum: $\lambda_{max.}^{CH_3OH}$ 332 m$\mu$ ($\epsilon$ 145)

*Analysis.*—Calculated for $C_{12}H_{23}O_3NS_3$: C, 46.26; H, 6.87; N, 4.15. Found: C, 46.65; H, 6.98; N, 3.97.

The 6 g. of by-product mentioned above are dissolved in 100 cc. of a 5% aqueous solution of potassium hydroxide, and the solution is allowed to stand over night at room temperature, acidified with hydrochloric acid and extracted with chloroform. A gum-like precipitate, insoluble in the chloroform, is obtained. The solvent extract is washed with water and dried. The chloroform is distilled off and 1.5 g. of crystals are recovered. The insoluble by-product is again treated with 70 cc. of a 5% aqueous solution of potassium hydroxide and additional 0.3 g. of crystals are obtained. The crystals obtained from the by-product are recrystallized from ethyl acetate-petroleum ether to obtain 0.8 g. of crystals of N-(6,8-dithiooctanoyl)-DL-methionine, having a melting point of 99–102° C., undepressed on admixture with the standard compound prepared above.

Ultraviolet absorption spectrum: $\lambda_{max.}^{CH_3OH}$ 332 m$\mu$ ($\epsilon$ 145)

Example 12

A hot methanol solution of sodium disulfide prepared from 5.0 g. of sodium sulfide, $Na_2S \cdot (9H_2O)$, 0.55 g. of sulfur and 50 cc. of methanol is mixed, drop by drop while stirring, with a solution of 5.0 g. of 6,8-dichlorooctanoylaniline in 20 cc. of methanol, and the mixture is refluxed for six hours. 20 cc. of a 3% aqueous solution of caustic soda are added and the combined solutions are refluxed for an hour and a half. The methanol is removed and the residue is extracted with chloroform. The extract is washed with water and dried. The chloroform is distilled off. The residue is dissolved in benzene and petroleum ether is added to precipitate crystals of 6,8-dithiooctanoyl aniline, which is recrystallized from benzene-petroleum ether to obtain crystals which have a melting point of 73° C.

Ultraviolet absorption spectrum: $\lambda_{max.}^{CH_3OH}$ 332 m$\mu$

*Analysis.*—Calculated for $C_{14}H_{19}ONS_2$: C, 59.78; H, 6.76; N, 4.98. Found: C, 59.92; H, 6.50; N, 5.19.

Example 13

To a hot methanol solution of sodium disulfide prepared from 14.4 g. of sodium sulfide, $Na_2S \cdot (9H_2O)$, 1.6 g. of sulfur and 150 cc. of ethanol there is added drop by drop a solution of 16.6 g. of 1-isonicotinoyl-2-(6,8-dichlorooctanoyl)-hydrazine in 50 cc. of ethanol under stirring, and the mixture is refluxed for five hours. It is then acidified to a pH of 2 with ethanol saturated with hydrogen chloride gas. Crystals are precipitated. They are gathered by filtration, washed with ether, and dissolved in absolute ethanol under heating. An insoluble portion is filtered off, and ether is added to the filtrate to produce 14.1 g. (78% of the theoretical yield) of the hydrochloride of 1-isonicotinoyl-2-(6,8-dithiooctanoyl)-hydrazine, which is recrystallized from absolute ethanol and ether as crystals having a melting point of 179–181° C.

*Analysis.*—Calculated for $C_{14}H_{20}O_2N_3S_2Cl$: C, 46.46; H, 5.57; N, 11.61. Found: C, 46.00; H, 5.74; N, 11.57.

Hydrolysis of the product produces 1-isonicotinoyl-2-(6,8-dithiooctanoyl)-hydrazine, which is recrystallized from ethyl acetate as crystals having a melting point of 116° C.

*Analysis.*—Calculated for $C_{14}H_{19}O_2N_3S_2$: C, 51.68; H, 5.89; N, 12.92. Found: C, 51.56; H, 5.95; N, 12.31.

Example 14

To 62 g. of sodium thiosulfate dissolved in 340 cc. of water, there are added 20 g. of 6,8-dichlorooctanoyl acide (melting point: 79° C.) in 280 cc. of ethanol and then 7 g. of sodium iodide. The solution thus obtained is heated under reflux for twenty hours, while 5% of a caustic soda solution are added at such a rate so as to keep the pH of the reaction mixture weakly alkaline at all times. The ethanol is then removed by distillation. The remaining solution is extracted with ethyl acetate and the extract is dried. The ethyl acetate is distilled off to obtain a crystalline residue which is recrystallized from ethanol-benzene to form needles of 6,8-dithiooctanoyl amide, having a melting point of 122–124° C. Yield: 11 g.

Ultraviolet absorption spectrum: $\lambda_{max.}^{C_6H_4}$ 332 m$\mu$ ($\epsilon$ 146)

*Analysis.*—Calculated for $C_8H_{15}ONS_2$: C, 46.78; H, 7.37; N, 6.82. Found: C, 47.01; H, 7.52; N, 6.55.

The reactivity of 6,8-dichlorooctanoyl chloride is substantially the same as that of acetyl chloride or benzoyl chloride with respect to primary and secondary amines. 6,8-dichlorooctanoyl chloride is, thus, capable of reacting with any amine having a hydrogen atom directly linked to the nitrogen atom. The amines useful for performing the method of this invention include ammonia and primary and secondary amines of all types. The amines recited in Examples 2 to 7 may thus be replaced by other amines, and the corresponding 6,8-dithiooctanoic acid amides prepared. The following amines are merely illustrative of other compounds capable of reacting with the halides of 6,8-dihalogeno octanoic acid in the aforedescribed manner:

Methylamine, n-butyl amine, 3-aminopentane, ethyl-n-propyl amine, di-n-hexyl amine, cyclohexyl amine, 2-methyl-1-amino cyclohexane, 9-aminodecalin, o-toluidine, α-phenyl ethyl amine, p-ethyl aniline, N-ethyl aniline, 2-amino thiazol, 6-amino-2-picoline, and diallylamine.

While the invention has been described with particular reference to specific embodiments, it is to be understood that it is not limited thereto, but is to be construed broadly and restricted solely by the scope of the appended claims.

We claim:

1. A 6,8-dichlorooctanoyl amide of the formula

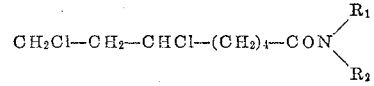

wherein

R$_1$ and R$_2$ are selected from the group consisting of hydrogen, lower alkyl, lower alkenyl, cyclohexyl, lower alkyl substituted cyclohexyl, decalyl, phenyl, lower alkyl substituted phenyl, phenyl substituted lower alkylene, thiazolyl, pyridyl, lower alkyl substituted pyridyl, and the residues of isonicotinic acid hydrazide, α-amino acids, and lower alkyl esters of α-amino acids.

2. 6,8-dichlorooctanoyl amide.

3. N-diisopropyl-6,8-dichloro octanoyl amide.
4. N-(6,8-dichlorooctanoyl)-methionine.
5. Dimethyl N-(6,8-dichlorooctanoyl)-glutamate.
6. 6,8-dichlorooctanoyl anilide.
7. 1-isonicotinoyl-2-(6,8-dichlorooctanoyl)-hydrazine.
8. A 6,8-dithiooctanoyl amide of the formula

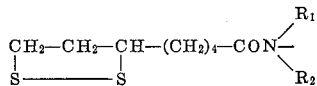

wherein $R_1$ is a member selected from a first group consisting of the residues of isonicotinic acid hydrazide, α-amino acids, and lower alkyl esters of α-amino acids, and $R_2$ is a member selected from a second group consisting of hydrogen and the members of the first group.

9. N-diisopropyl-6,8-dithio-octanoyl amide.
10. N-(6,8-dithiooctanoyl)-glutamic acid.
11. N-(6,8-dithiooctanoyl)-methionine.
12. 1-isonicotinoyl-2-(6,8-dithiooctanoyl) - hydrazine hydrochloride.
13. 1-isonicotinoyl-2-(6,8-dithiooctanoyl)-hydrazine.

References Cited by the Examiner

UNITED STATES PATENTS

| | | | |
|---|---|---|---|
| 2,694,066 | 11/1954 | Reed | 260—327 |
| 2,980,716 | 4/1961 | Reed | 260—327 |

FOREIGN PATENTS

| | | |
|---|---|---|
| 577,489 | 6/1959 | Canada. |
| 608,575 | 11/1960 | Canada. |

OTHER REFERENCES

Beilstein: "Handbuch der Organischen Chemie," H.W., page 251, (1920) (Springer) Band II.

Noller: "Chemistry of Organic Compounds," (Saunders) (1957), pages 160, 171, 244.

Wagner-Zook: Synthetic Organic Chemistry, pages 546 to 547, 566 and 798, John Wiley and Sons (1953).

JOHN D. RANDOLPH, *Primary Examiner.*

IRVING MARCUS, WALTER A. MODANCE, B. H. STRIZAK, A. H. WINKELSTEIN, *Examiners.*

ROBERT T. BOND, DANIEL D. HORWITZ, A. L. ROTMAN, *Assistant Examiners.*